US008878875B2

(12) United States Patent
Park et al.

(10) Patent No.: US 8,878,875 B2
(45) Date of Patent: Nov. 4, 2014

(54) ABSOLUTE IMAGE ORIENTATION DISPLACEMENT MONITORING AND MANIPULATION APPARATUS

(75) Inventors: Ji Hyung Park, Seoul (KR); Dong Wook Yoon, Busan (KR); Joong-Ho Lee, Yongin-si (KR); Ki Won Yeom, Goyang-si (KR)

(73) Assignee: Korea Institute of Science and Technology, Seoul (KR)

( * ) Notice: Subject to any disclaimer, the term of this patent is extended or adjusted under 35 U.S.C. 154(b) by 386 days.

(21) Appl. No.: 13/159,227

(22) Filed: Jun. 13, 2011

(65) Prior Publication Data

US 2011/0310094 A1 Dec. 22, 2011

(30) Foreign Application Priority Data

Jun. 21, 2010 (KR) ........................ 10-2010-0058763

(51) Int. Cl.

| | |
|---|---|
| ***G06T 19/00*** | (2011.01) |
| ***G06F 3/0488*** | (2013.01) |
| ***G06F 3/0484*** | (2013.01) |
| ***G06F 1/16*** | (2006.01) |
| ***G06T 19/20*** | (2011.01) |

(52) U.S. Cl.

CPC .............. *G06T 19/20* (2013.01); *G06F 3/0488* (2013.01); *G06F 3/04845* (2013.01); *G06F 1/1694* (2013.01); *G06F 1/1626* (2013.01); *G06F 1/1643* (2013.01); *G06T 2219/2016* (2013.01)

USPC ............................ 345/659; 345/173; 345/419

(58) Field of Classification Search

None

See application file for complete search history.

(56) References Cited

U.S. PATENT DOCUMENTS

| | | | | |
|---|---|---|---|---|
| 7,236,156 B2 * | 6/2007 | Liberty et al. | ................ | 345/158 |
| 7,466,304 B2 * | 12/2008 | Yoshihara | ..................... | 345/157 |
| 7,535,456 B2 * | 5/2009 | Liberty et al. | ................ | 345/158 |
| 7,773,074 B2 * | 8/2010 | Arenson et al. | ............... | 345/173 |
| 7,803,054 B1 * | 9/2010 | Ogus et al. | ...................... | 463/42 |
| 2005/0253806 A1 * | 11/2005 | Liberty et al. | ................ | 345/156 |
| 2011/0248987 A1 * | 10/2011 | Mitchell | ....................... | 345/419 |

FOREIGN PATENT DOCUMENTS

| | | |
|---|---|---|
| JP | 2002-298160 A | 10/2002 |
| JP | 2007-026219 A | 2/2007 |

OTHER PUBLICATIONS

Shoemake, K., "Animating Rotation with Quaternion Curves," *ACM SIGGRAPH Computer Graphics,* Jul. 22-26, 1985, pp. 245-254, vol. 19, No. 3, San Francisco, USA.

* cited by examiner

*Primary Examiner* — David Zarka
*Assistant Examiner* — Jason Pringle-Parker
(74) *Attorney, Agent, or Firm* — Fenwick & West LLP

(57) ABSTRACT

An image manipulation apparatus for displaying a three-dimensional image of an object displayed on a display apparatus in correspondence with orientation of a mobile apparatus includes: an orientation information processor configured to generate orientation displacement information corresponding to orientation of the mobile apparatus; a renderer configured to generate a rendering image of the three-dimensional image using the three-dimensional image of the object and the orientation displacement information; and a transmitter configured to transmit the rendering image to the display apparatus. An image manipulation method of displaying a three-dimensional image of an object displayed on a display apparatus in correspondence with orientation of a mobile apparatus includes: generating orientation displacement information corresponding to orientation of the mobile apparatus; generating a rendering image of the three-dimensional image using the three-dimensional image and the orientation displacement information; and transmitting the rendering image to the display apparatus.

20 Claims, 8 Drawing Sheets

201 202 203 204

501
R(Acc^init, Mag^init)
Nmr10^init
Nmr11^init
Acc^init
Mag^init
x
y
z
502
R(Acc^cur_f, Mag^cur_f)
Nmr10^cur_f
Mag^cur_f
Acc^cur_f
Nmr11^cur_f

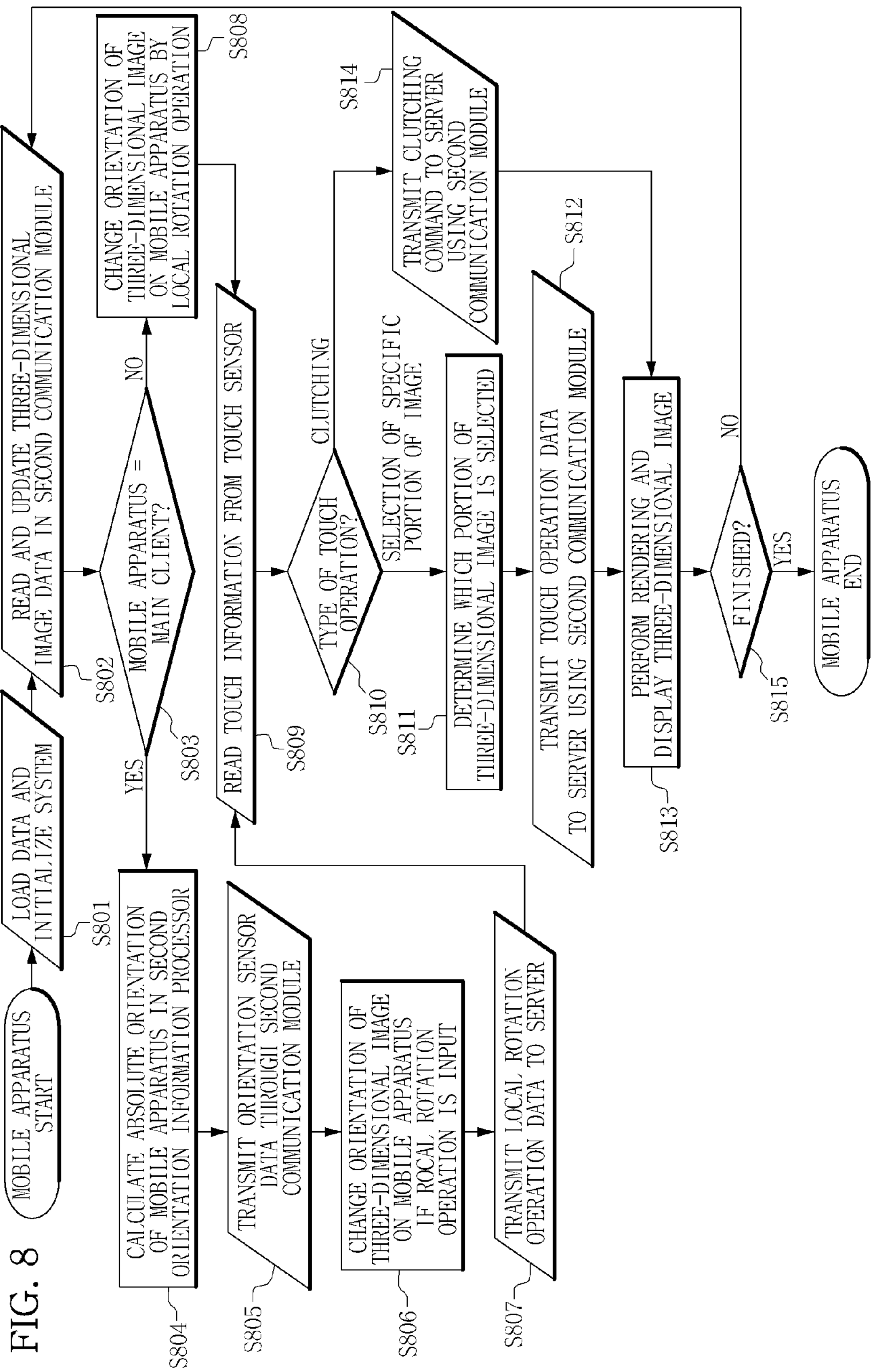
FIG. 8
MOBILE APPARATUS START
LOAD DATA AND INITIALIZE SYSTEM
S801
READ AND UPDATE THREE-DIMENSIONAL IMAGE DATA IN SECOND COMMUNICATION MODULE
S802
MOBILE APPARATUS = MAIN CLIENT?
S803
YES
NO
CALCULATE ABSOLUTE ORIENTATION OF MOBILE APPARATUS IN SECOND ORIENTATION INFORMATION PROCESSOR
S804
TRANSMIT ORIENTATION SENSOR DATA THROUGH SECOND COMMUNICATION MODULE
S805
CHANGE ORIENTATION OF THREE-DIMENSIONAL IMAGE ON MOBILE APPARATUS IF ROCAL ROTATION OPERATION IS INPUT
S806
TRANSMIT LOCAL ROTATION OPERATION DATA TO SERVER
S807
CHANGE ORIENTATION OF THREE-DIMENSIONAL IMAGE ON MOBILE APPARATUS BY LOCAL ROTATION OPERATION
S808
READ TOUCH INFORMATION FROM TOUCH SENSOR
S809
TYPE OF TOUCH OPERATION?
S810
CLUTCHING
SELECTION OF SPECIFIC PORTION OF IMAGE
DETERMINE WHICH PORTION OF THREE-DIMENSIONAL IMAGE IS SELECTED
S811
TRANSMIT TOUCH OPERATION DATA TO SERVER USING SECOND COMMUNICATION MODULE
S812
PERFORM RENDERING AND DISPLAY THREE-DIMENSIONAL IMAGE
S813
TRANSMIT CLUTCHING COMMAND TO SERVER USING SECOND COMMUNICATION MODULE
S814
FINISHED?
S815
NO
YES
MOBILE APPARATUS END

ABSOLUTE IMAGE ORIENTATION DISPLACEMENT MONITORING AND MANIPULATION APPARATUS

CROSS-REFERENCE TO RELATED APPLICATION

This application claims priority to Korean Patent Application No. 10-2010-0058763, filed on Jun. 21, 2010, and all the benefits accruing therefrom under 35 U.S.C. §119, the contents of which in its entirety are herein incorporated by reference.

BACKGROUND

1. Field

The present disclosure relates to an apparatus and method for manipulating an image and, more particularly, to an apparatus and method for manipulating a three-dimensional image in association with an operation of a mobile apparatus.

2. Description of the Related Art

A three-dimensional technique enables a user to virtually experience various models. As the three-dimensional image technique has been developed, attention to a technique of manipulating a displayed three-dimensional image has increased.

As a technique of manipulating a three-dimensional image of the related art, there are a touch interaction technique, a bare hand recognition technique and a technique using a dedicated controller.

The touch interaction technique, which manipulates a three-dimensional image by enabling a user to directly touch a display screen, is intuitive and efficient in two-dimensional manipulation, but is not suitable for three-dimensional rotation. Therefore, in the touch interaction technique, a degree of freedom needs to be separated for three-dimensional image rotation. In addition, if a user cannot approach a display or if a display screen is too large, it is difficult to touch the screen.

The bare hand recognition technique, which recognizes bare hand movement of a user using a camera of a server system so as to perform three-dimensional manipulation, is advantageous in that three-dimensional manipulation is possible without a special controller and a user does not need to approach a screen in order to perform manipulation, but is restricted in terms of accuracy and a degree of freedom. In addition, since an image recognition based technique is not yet advanced, a recognition rate is low.

The technique using the dedicated controller, which performs three-dimensional manipulation, for example, using a digital pen, a dedicated remote controller or a dedicated motion controller, is intuitive and efficient, but has a difficulty in apparatus maintenance. Since the number of dedicated controllers is increased if the number of users is increased, price competitiveness decreases. In addition, if the dedicated controller is provided at a public place, the dedicated controller may be stolen.

SUMMARY

The present disclosure is directed to providing an apparatus and method for manipulating an image which is able to intuitively and efficiently manipulate a three-dimensional image at a long distance and to obtain excellent accessibility and enhanced price competiveness even when the number of users is increased, by manipulating a three-dimensional image such that an absolute orientation of a mobile apparatus matches an absolute orientation of a three-dimensional image displayed on a display.

In one aspect, there is provided an image manipulation apparatus for displaying a three-dimensional image of an object displayed on a display apparatus in correspondence with orientation of a mobile apparatus, including: an orientation information processor configured to generate orientation displacement information corresponding to orientation of the mobile apparatus; a renderer configured to generate a rendering image of the three-dimensional image using the three-dimensional image of the object and the orientation displacement information; and a transmitter configured to transmit the rendering image to the display apparatus.

The orientation information processor may receive orientation sensor information corresponding to orientation of the mobile apparatus from the mobile apparatus and generate the orientation displacement information using the orientation sensor information.

The orientation information processor may include: a noise attenuator configured to receive the orientation sensor information and eliminate noise; and a three-dimensional displacement information calculator configured to receive the orientation sensor information from which noise is eliminated, calculate an orientation displacement from an initial orientation to a current orientation of the mobile apparatus, and generate the orientation displacement information.

The orientation information processor may include: a three-dimensional displacement information calculator configured to receive the orientation sensor information, calculate an orientation displacement from an initial orientation to a current orientation of the mobile apparatus, and generate the orientation displacement information; and a noise attenuator configured to receive the orientation displacement information and eliminate noise.

The noise attenuator may eliminate noise using a spherical linear interpolation (SLERP) method which is a quaternion interpolation method.

The noise attenuator may include one or more selected from a group including a low pass filter (LPF), a Kalman filter, an extended Kalman filter, an unscented Kalman filter and a particle filter.

The image manipulation apparatus may further include a touch event processor configured to receive touch operation information corresponding to a touch of the mobile apparatus from the mobile apparatus and generate touch event occurrence information using the touch operation information, wherein the renderer may generate the rendering information of the three-dimensional image using the three-dimensional image, the orientation displacement information and the touch event occurrence information.

The renderer may include: a three-dimensional image converter configured to convert the three-dimensional image in a space using the orientation displacement information and the touch event occurrence information and generate three-dimensional image conversion information; a rendering controller configured to control a physical property and rendering characteristics of the three-dimensional image to be rendered and transmit or receive the three-dimensional image conversion information to or from the three-dimensional image converter; and a rendering calculator configured to perform rendering and generate and transmit rendering information.

The image manipulation apparatus may further include a first controller configured to generate and transmit or receive a first control signal for controlling the three-dimensional image generator, the orientation information processor, the touch event processor and the renderer.

The image manipulation apparatus may further include a system chip including: a processor configured to perform operations of the three-dimensional image generator, the orientation information processor, the touch event processor and the renderer; a second controller configured to generate and transmit or receive a second control signal for controlling the three-dimensional image generator, the orientation information processor, the touch event processor, the renderer and the first controller; and a peripheral device interface for receiving and transmitting the orientation sensor information and the touch operation information to the second controller.

The image manipulation apparatus may further include a communication module configured to receive the orientation sensor information and the touch operation information from the mobile apparatus and transmit the orientation sensor information and the touch operation information to the peripheral device interface.

The communication module may perform communication using one or more communication methods selected from a group including wireless Local Area Network (LAN), Metropolitan Area Network (MAN), Global System for Mobile Communication (GSM), Enhanced Data GSM Environment (EDGE), High Speed Downlink Packet Access (HSDPA), Wideband Code Division Multiple Access (W-CDMA), Code Division Multiple Access (CDMA), Time Division Multiple Access (TDMA), Bluetooth, Zigbee, Wi-Fi, Voice over Internet Protocol (VoIP), World Interoperability for Microwave Access (Wi-MAX), and ultrasonic communication method.

The image manipulation apparatus may further include a memory, wherein the three-dimensional image generator, the orientation information processor, the touch event processor and the renderer may be included in the memory.

The transmitter may transmit the rendering image to a plurality of mobile apparatuses.

In another aspect, there is provided an image manipulation method of displaying a three-dimensional image of an object displayed on a display apparatus in correspondence with orientation of a mobile apparatus, including: generating orientation displacement information corresponding to orientation of the mobile apparatus; generating a rendering image of the three-dimensional image using the three-dimensional image and the orientation displacement information; and transmitting the rendering image to the display apparatus.

The generating of the orientation displacement information may include calculating an orientation displacement from an initial orientation to a current orientation of the mobile apparatus and generating the orientation displacement information.

The generating of the orientation displacement information may include: receiving orientation sensor information and eliminating noise; and receiving the orientation sensor information from which noise is eliminated, calculating an orientation displacement from an initial orientation to a current orientation of the mobile apparatus, and generating the orientation displacement information.

The generating of the orientation displacement information may include: receiving orientation sensor information, calculating an orientation displacement from an initial orientation to a current orientation of the mobile apparatus, and generating the orientation displacement information; and receiving the orientation displacement information and eliminating noise.

The attenuating of the noise may include eliminating noise using a SLERP method which is a quaternion interpolation method.

In the attenuating of the nose, noise may be attenuated using one or more selected from a group including a LPF, a Kalman filter, an extended Kalman filter, an unscented Kalman filter and a particle filter.

The image manipulation method may further include: receiving touch operation information corresponding to a touch of the mobile apparatus from the mobile apparatus; and generating touch event occurrence information using the touch operation information, wherein the generating of the rendering image may include generating the rendering information of the three-dimensional image using the three-dimensional image, the orientation displacement information and the touch event occurrence information.

The transmitting may include transmitting the rendering image to a plurality of mobile apparatuses.

The transmitting may include transmitting the rendering image to another display apparatus.

BRIEF DESCRIPTION OF THE DRAWINGS

The above and other aspects, features and advantages of the disclosed exemplary embodiments will be more apparent from the following detailed description taken in conjunction with the accompanying drawings in which:

FIG. 8 is a flowchart illustrating an operation of an image manipulation mobile apparatus according to an embodiment.

DETAILED DESCRIPTION

Figure 1:
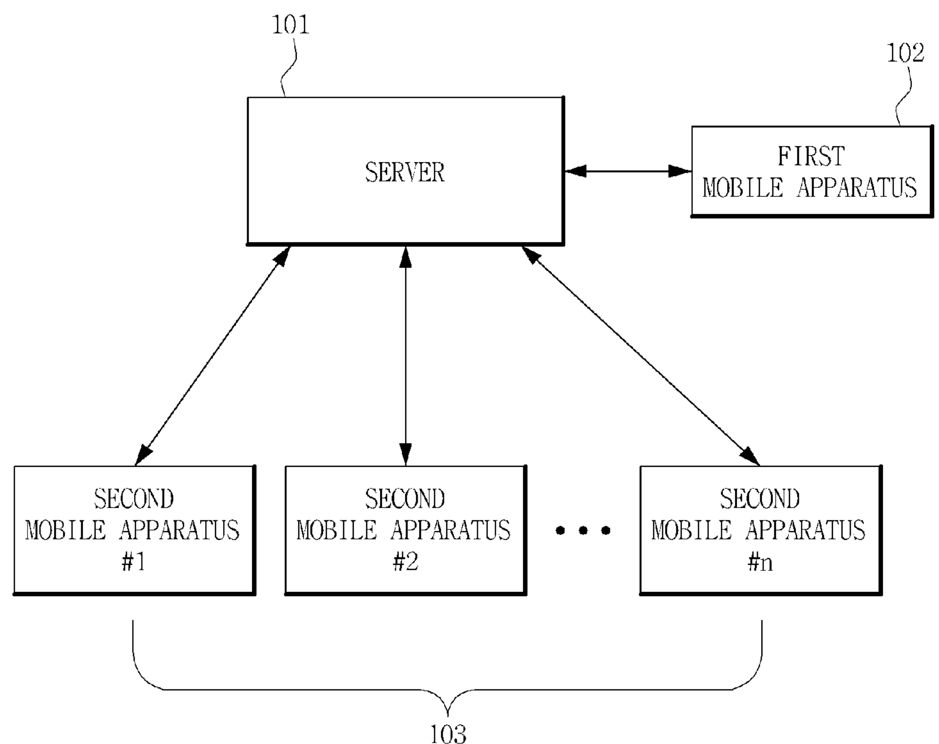
FIG. 1 is a block diagram showing a system for implementing an image manipulation apparatus according to an embodiment using a server and a mobile apparatus.

Exemplary embodiments now will be described more fully hereinafter with reference to the accompanying drawings, in which exemplary embodiments are shown. The present disclosure may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art. In the description, details of well-known features and techniques may be omitted to avoid unnecessarily obscuring the presented embodiments.

The terminology used herein is for the purpose of describing particular embodiments only and is not intended to be limiting of the present disclosure. As used herein, the singular forms “a”, “an” and “the” are intended to include the plural forms as well, unless the context clearly indicates otherwise. Furthermore, the use of the terms a, an, etc. does not denote a limitation of quantity, but rather denotes the presence of at least one of the referenced item. The use of the terms “first”, "second", and the like does not imply any particular order, but they are included to identify individual elements. Moreover, the use of the terms first, second, etc. does not denote any order or importance, but rather the terms first, second, etc. are used to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

In the drawings, like reference numerals denote like elements. The shape, size and regions, and the like, of the drawing may be exaggerated for clarity.

FIG. 1 is a block diagram showing a system for implementing an image manipulation apparatus according to an embodiment using a server and a mobile apparatus.

Referring to FIG. 1, the system for implementing the image manipulation apparatus according to the embodiment using the server and the mobile apparatus includes a server 101, a first mobile apparatus 102, and second mobile apparatuses #1 to #n 103. The server 101, the first mobile apparatus 102 and the second mobile apparatuses #1 to #n 103 may be connected through communication.

The first mobile apparatus 102 and the second mobile apparatuses #1 to #n 103 may be implemented in different manners. The first mobile apparatus 102 may function as a main client and the second mobile apparatuses #1 to #n 103 may function as a sub client. Although the number of first mobile apparatuses 102 is one in FIG. 1, this is only exemplary and a plurality of first mobile apparatuses 102 may be used if necessary.

The first mobile apparatus 102 first receives three-dimensional image data corresponding to an object from the server 101. Here, the object is an object to be displayed as a three-dimensional image and may include products such as vehicles or electronics or characters such as cartoon characters. The three-dimensional image data is used to convert an object into a three-dimensional image.

The first mobile apparatus 102 receives three-dimensional image data and generates orientation displacement information data corresponding to rotation of the first mobile apparatus 102. The orientation displacement information data is obtained by computing an orientation displacement from an initial orientation to a current orientation of the first mobile apparatus 102. An absolute orientation of the first mobile apparatus 102 may match an absolute orientation of a three-dimensional image displayed on the server using the orientation displacement information data. A process of generating orientation displacement information data will be described in detail later.

If the orientation displacement information data is generated, the first mobile apparatus 102 generates first touch event occurrence data corresponding to touch of the first mobile apparatus 102. The first touch event occurrence data is generated using touch operation data and is used to perform local rotation or an operation of a specific part. The touch operation data corresponds to a touch operation, such as tap, double tap, panning, flicking, drag and drop, pinching or stretching, or an operation for selecting a specific part of a three-dimensional image which is currently displayed through touch. After the above process, the first mobile apparatus 102 displays a three-dimensional image using the three-dimensional image data and the first touch event occurrence data.

The server 101 generates the three-dimensional image data. The server 101 receives the orientation displacement information data and the first touch event occurrence data and displays the three-dimensional image using the three-dimensional image data, the orientation displacement information data and the first touch event occurrence data.

The three-dimensional images displayed on the first mobile apparatus 102 and the server 101 are different in that the three-dimensional image displayed on the server 101 uses the orientation displacement information data and the three-dimensional image displayed on the first mobile apparatus 102 does not use the orientation displacement information data. That is, while the orientation displacement information data corresponding to the orientation of the mobile apparatus as well as the first touch event occurrence data is applied to the server 101 so as to display the three-dimensional image, only the first touch event occurrence data corresponding to a user touch operation is applied to the first mobile apparatus 102 so as to display the three-dimensional image. Thus, if the absolute orientation of the first mobile apparatus 102 is changed, the absolute orientation of the three-dimensional image displayed on the server 101 is changed.

The second mobile apparatuses #1 to #n 103 receive the three-dimensional image data from the server 101, generate second touch event occurrence data corresponding to touch of the second mobile apparatuses #1 to #n 103, and display a three-dimensional image using the second touch event occurrence data.

Since the server 101 uses the orientation displacement information data and the first touch event occurrence data received from the first mobile apparatus 102, the rotation operation of the three-dimensional image displayed on the server 101 is performed only using the first mobile apparatus 102. The touch operation of the second mobile apparatuses #1 to #n 103 is not applied to the three-dimensional image displayed on the server 101, but is applied to the three-dimensional image displayed on the second mobile apparatuses #1 to #n.

Figure 2:
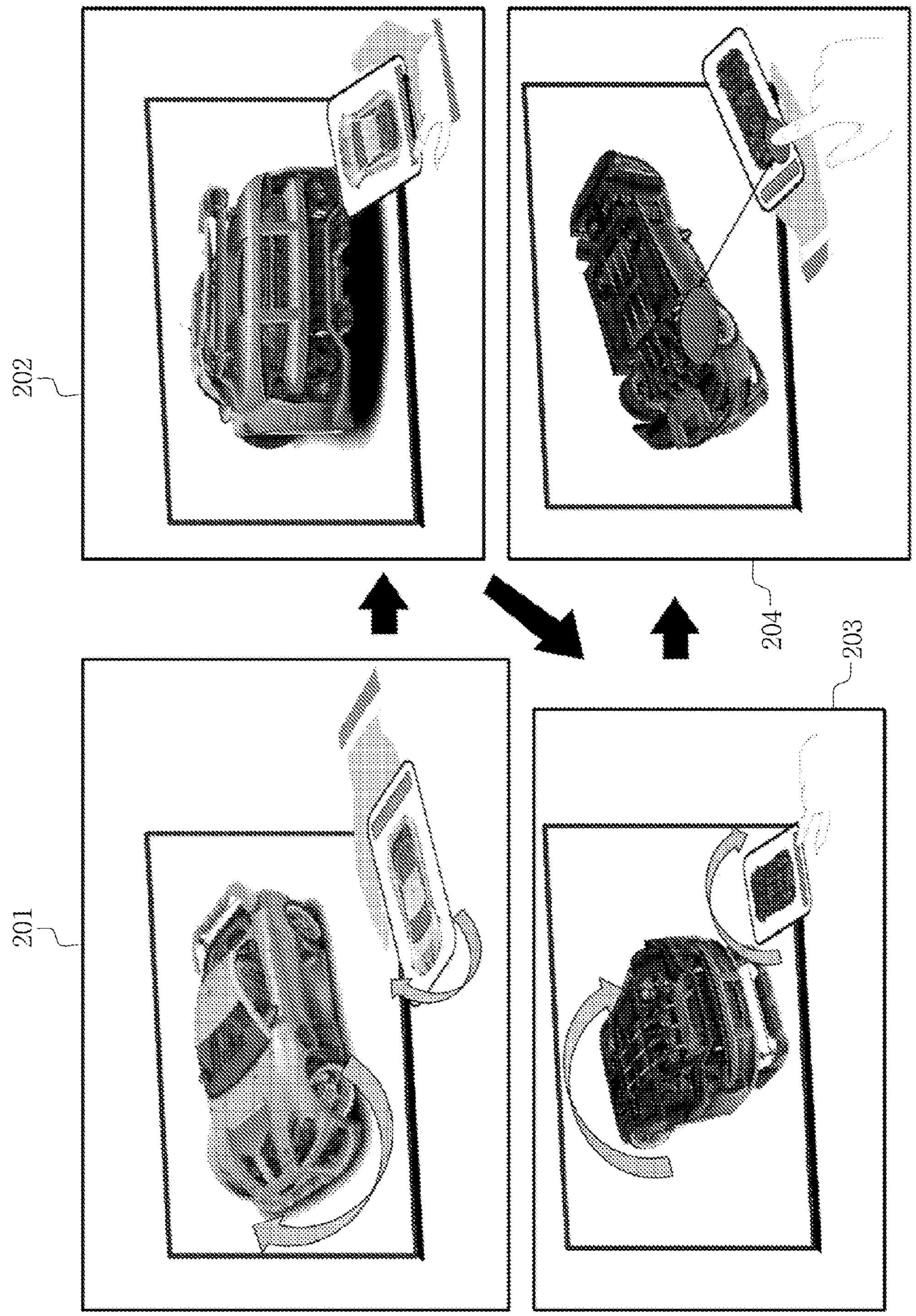
FIG. 2 is a diagram illustrating an example of an image manipulation apparatus according to an embodiment.

FIG. 2 is a diagram illustrating an example of an image manipulation apparatus according to an embodiment.

First, in a left upper portion 201, a large screen is a display screen of a server and a small screen is a screen of a mobile apparatus which is a main client. A three-dimensional image of a vehicle is obliquely displayed on the display screen of the server, and a three-dimensional image of a vehicle is displayed on the screen of the mobile apparatus in a top view. In the portion 201, the current absolute orientation of the mobile apparatus is mapped to the absolute orientation of the three-dimensional image of the vehicle displayed on the display screen of the server.

A right upper portion 202 shows the case where a user rotates the mobile apparatus from the state of the portion 201 to the right. The mobile apparatus rotates from the state of the portion 201 to the right, and the three-dimensional image of the vehicle displayed on the display screen of the server rotates to the right along the absolute orientation of the mobile apparatus. Accordingly, the three-dimensional image of the vehicle displayed on the display screen of the server shows the backside of the vehicle.

A left lower portion 203 shows the case where a user manipulates the three- dimensional image of the vehicle with a touch in the state of the portion 202. As shown in the portion 203, the user drags a slider bar displayed on the screen from the left to the right so as to rotate the three-dimensional image of the vehicle displayed on the mobile apparatus, thereby turning the three-dimensional image of the vehicle over. Then, the three-dimensional image of the vehicle displayed on the display screen of the server is rotated and turned over. An operation for performing a rotation operation with a touch on a screen in which an axis is fixed is called local rotation. Local rotation may be performed using a user interface (UI) such as a scroll bar or a button and by dragging a multi-touch screen without a UI.

A right lower portion 204 shows the case where a user rotates the mobile apparatus to the right and performs a selection operation with a touch in the state of the portion 203. First, since the user rotates the mobile apparatus to the right, the three-dimensional image of the vehicle displayed on the display screen of the server rotates. The user touches a wheel portion of the three-dimensional image of the vehicle displayed on the display screen of the mobile apparatus so as to perform a selection operation. In this case, a predefined touch event occurs. In one embodiment, the wheel may be turned or moved from side to side. In this way, touch events in which a vehicle door is opened when the vehicle door is touched and a wiper is moved when the wiper is touched may be predefined. In the case where the three-dimensional image is not the vehicle but is a character, touch events in which a hand is shaken when the hand is clicked and the character speaks when a mouth is clicked may be predefined.

In addition to the rotation operation and the selection operation, a clutching operation is possible. For example, by using a touch operation such as double tap, the three-dimensional image displayed on the display screen of the server may be fixed even when the mobile apparatus moves. In one embodiment, if clutching is performed, a rotation operation using orientation sensor data and the local rotation operation may not be performed. In other embodiment, if clutching is performed, the rotation operation using the orientation sensor data may not be performed but the local rotation operation may be performed.

The configuration of the case where the image manipulation apparatus according to one embodiment is implemented using the server and the mobile apparatus will be described in greater detail with reference to FIGS. 3 and 4.

Figure 3:
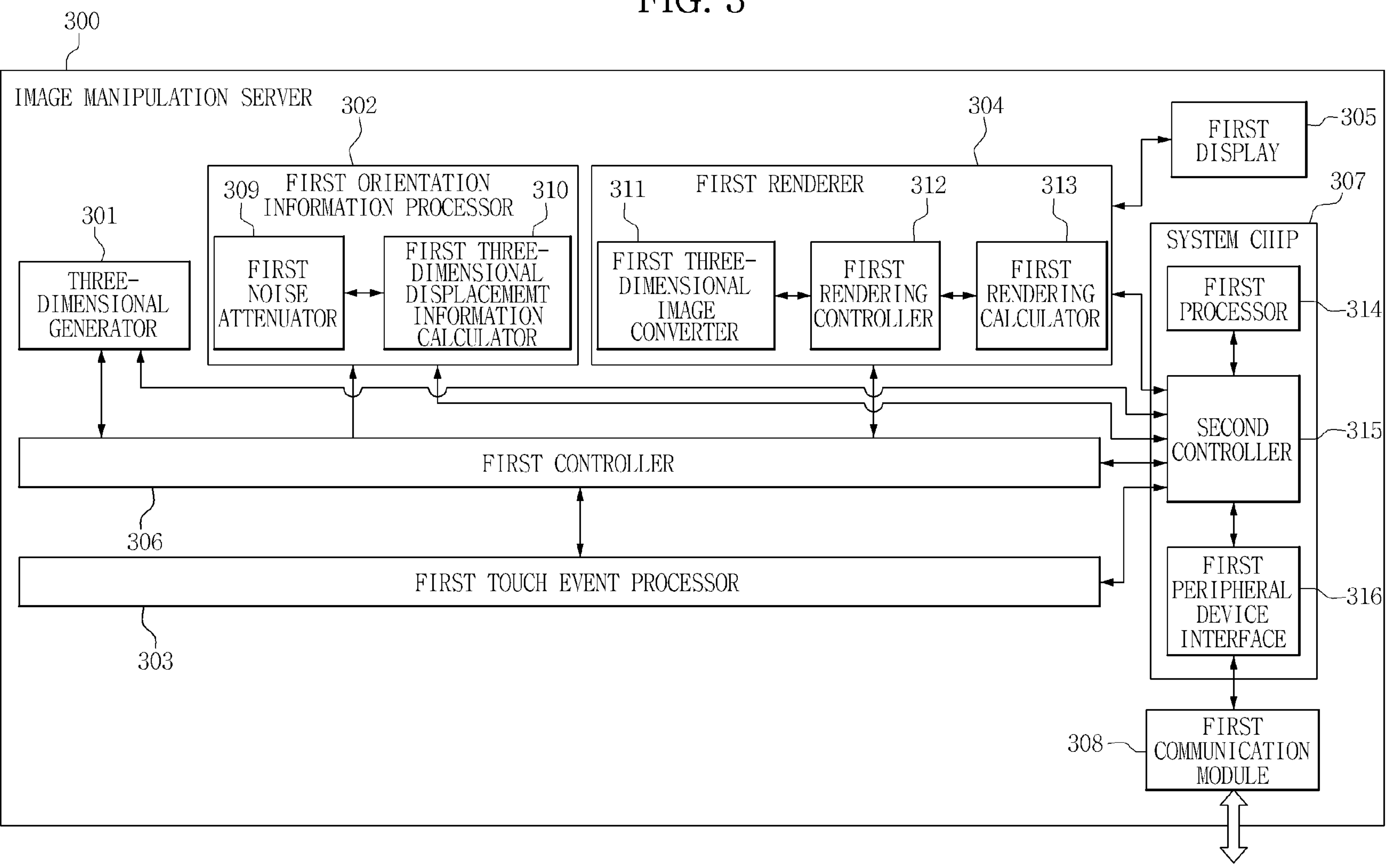
FIG. 3 is a block diagram showing the case of implementing an image manipulation apparatus according to an embodiment using a server.

FIG. 3 is a block diagram showing the case of implementing an image manipulation apparatus according to an embodiment using a server.

For convenience of description, a server which functions as an image manipulation apparatus is referred to as an image manipulation server.

Referring to FIG. 3, the image manipulation server 300 includes a three-dimensional image generator 301, a first orientation information processor 302, and a first touch event processor 303, a first renderer 304, a first display 305, a first controller 306, a system chip 307 and a first communication module 308.

In FIG. 3, the first display 305, the first controller 306, the system chip 307 and the first communication module 308 are not necessarily required for the image manipulation server 300 and may be added or deleted if necessary.

In particular, the first display 305 may be included in the image manipulation apparatus or may be separately provided as a display apparatus. If the first display 305 is separately provided as the display apparatus, the image manipulation apparatus includes a transmitter for transmitting an image. The transmitter may transmit an image to a mobile apparatus or another display apparatus in addition to the display apparatus.

One or more of the three-dimensional image generator 301, the first orientation information processor 302, the first touch event processor 303, the first renderer 304 and the first controller 306 may be included in a first memory in the form of an application.

The three-dimensional generator 301 generates three-dimensional image data of an object. The three-dimensional image data may be generated by the image manipulation server or received from an external medium. Here, the object is an object to be displayed as a three-dimensional image and may be products such as vehicles or electronics or characters such as cartoon characters. The three-dimensional image data is used to convert an object into a three-dimensional image.

The first orientation information processor 302 receives orientation sensor data corresponding to orientation of a mobile apparatus from the mobile apparatus and generates orientation displacement information data using the orientation sensor data. The orientation sensor data is acquired using an orientation sensor such as a compass, an accelerator or a gyro sensor of the mobile apparatus and is obtained by computing an orientation displacement from an initial orientation to a current orientation of the mobile apparatus. Using such orientation displacement information data, the absolute orientation of the mobile apparatus may match the absolute orientation of the three-dimensional image displayed on the first display 305 of the server.

In one embodiment, the first orientation information processor 302 includes a first noise attenuator 309 and a first three-dimensional displacement information calculator 310. The first noise attenuator 309 receives the orientation sensor data and eliminates noise. The first noise attenuator 309 may include one or more selected from a group including a low pass filter (LPF), a Kalman filter, an extended Kalman filter, an unscented Kalman filter and a particle filter. The first three-dimensional displacement information calculator 310 receives the orientation sensor data from which noise is eliminated, computes an orientation displacement from the initial orientation to the current orientation of the mobile apparatus, and generates the orientation displacement information data. Although the first orientation information processor 302 includes the first noise attenuator 309 and the first three-dimensional displacement information calculator 310 as individual components in FIG. 3, if noise is attenuated by a probability mode based state estimator such as a Kalman filter, an extended Kalman filter and a unscented Kalman filter and a particle filter, the first noise attenuator 309 and the first three-dimensional displacement information calculator 310 may be combined and included in the first orientation information processor 302. In addition, although the first noise attenuator 309 eliminates noise and then the first three-dimensional displacement information calculator 310 calculates the orientation displacement as described above, the first three-dimensional displacement information calculator 310 may calculate the orientation displacement and then the first noise attenuator 309 may eliminate noise.

The first touch event processor 303 receives touch operation data corresponding to a touch of the mobile apparatus from the mobile apparatus and generates touch event occurrence data using the touch operation data. The touch operation data corresponds to a touch operation, such as tap, double tap, flicking, drag and drop, pinching or stretching, or an operation for selecting a specific portion of a three-dimensional image which is currently displayed with a touch. The touch event occurrence data is generated using the touch operation data and enables local rotation or the operation for selecting the specific portion to be performed according to the touch operation data.

The first renderer 304 generates rendering data of the three-dimensional image using the three-dimensional image data, the orientation displacement information data and the touch event occurrence data. The generated rendering data is transmitted to the first display 305.

In one embodiment, the first renderer 304 may include a first three-dimensional image converter 311, a first rendering controller 312 and a first rendering calculator 313. The first three-dimensional image converter 311 converts the three-dimensional image in a space using the orientation displacement information data and the touch event occurrence data and generates three-dimensional image conversion information data. The first rendering controller 312 controls rendering characteristics such as a physical property such as texture or quality of the three-dimensional image, illumination and special effects, and transmits and receives the three-dimensional image conversion information data to and from the first three-dimensional image converter 311. The first rendering calculator 313 performs rendering, generates rendering data, and transmits the rendering data to the first display 305.

The first display 305 displays the three-dimensional image using the rendering data generated by the first renderer 304. The first display 305 may be a liquid crystal display (LCD), a plasma display panel (PDP), a projector display, a three-dimensional display using autostereography or hologram, such as a shutter glass type three-dimensional display, a lenticular type three-dimensional display or a parallax barrier type three-dimensional display, or a wearable display such as a helmet mount display (HMD) or a head up display (HUD).

The first controller 306 generates and transmits or receives a first control signal for controlling the three-dimensional image generator 301, the first orientation information processor 302, the first touch event processor 303 and the first renderer 304. The first controller 306 may receive the orientation displacement information data from the first orientation information processor 302 and receive a variety of control signals and data from the second controller 315 of the system chip 307. The system chip 307 serves to perform operations and control of the components of the server. In one embodiment, the system chip 307 may include a first processor 314, a second controller 315 and a first peripheral device interface 316. Although the components are integrated in the system chip 307 of the server in FIG. 3, this is only exemplary and the components may be separated. The first processor 314 performs the operations of the three-dimensional image generator 301, the first orientation information process 302, the first touch event processor 303 and the first renderer 304. The second controller 315 generates and transmits or receives a second control signal for controlling the three-dimensional image generator 301, the first orientation information processor 302, the first touch event processor 303, the first renderer 304 and the first controller 306. The first peripheral device interface 316 receives and transmits the orientation sensor data and the touch operation data to the second controller 315.

The first communication module 308 receives and transmits the orientation sensor data and the touch operation data from the mobile apparatus to the first peripheral device interface 316. The first communication module 308 may perform communication using one or more communication methods selected from a group including wireless Local Area Network (LAN), Metropolitan Area Network (MAN), Global System for Mobile Communication (GSM), Enhanced Data GSM Environment (EDGN), High Speed Downlink Packet Access (HSDPA), Wideband Code Division Multiple Access (W-CDMA), Code Division Multiple Access (CDMA), Time Division Multiple Access (TDMA), Bluetooth, Zigbee, Wi-Fi, Voice over Internet Protocol (VoIP), World Interoperability for Microwave Access (Wi-MAX), and ultrasonic communication method.

Figure 4:
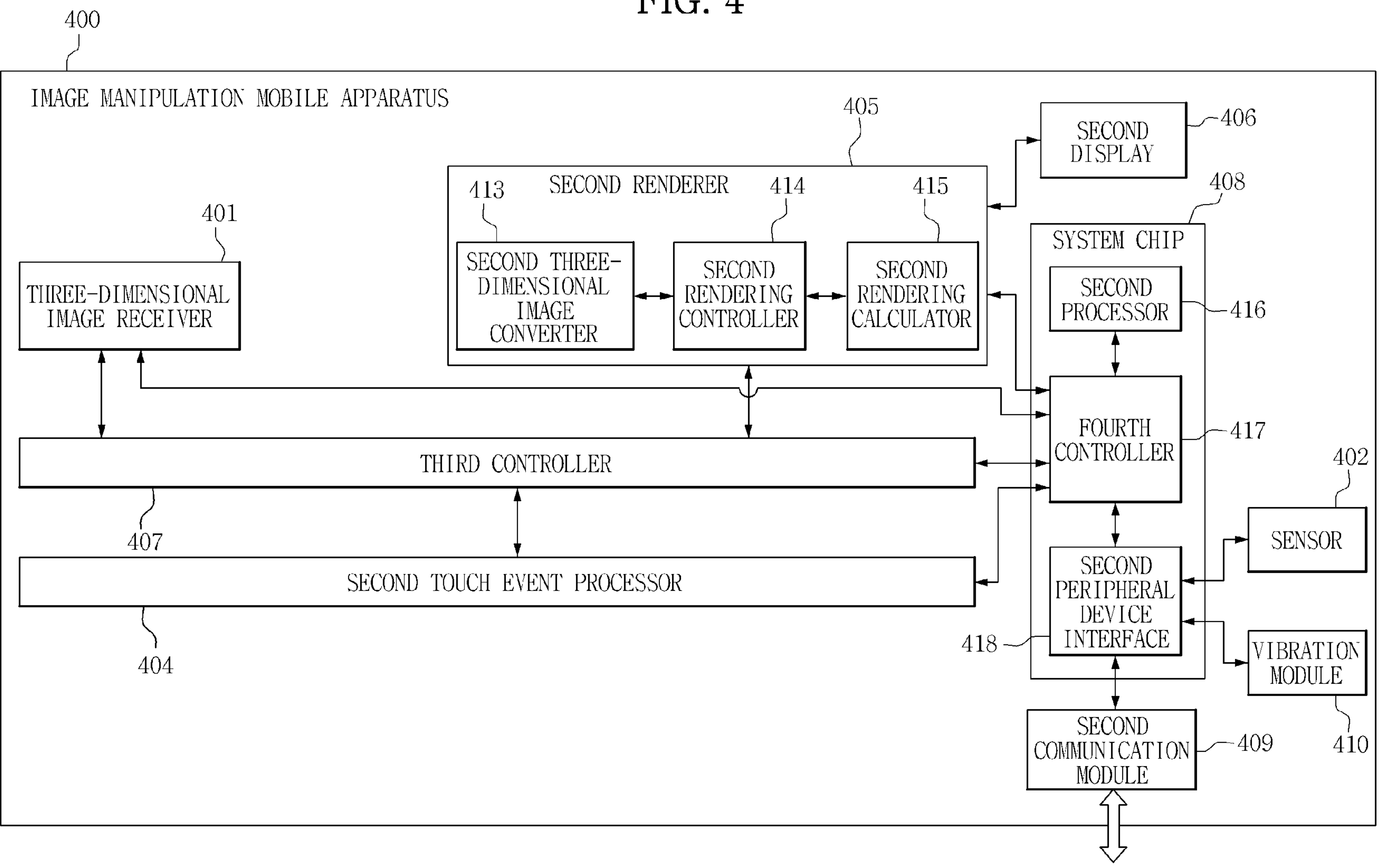
FIG. 4 is a block diagram showing the case of implementing an image manipulation apparatus according to an embodiment using a mobile apparatus.

FIG. 4 is a block diagram showing the case of implementing an image manipulation apparatus according to an embodiment using a mobile apparatus.

For convenience of description, a mobile apparatus functioning as an image manipulation apparatus is referred to as an image manipulation mobile apparatus.

Referring to FIG. 4, the image manipulation apparatus 400 according to one embodiment includes a three-dimensional image receiver 401, a sensor 402, a second touch event processor 404, a second renderer 405, and a second display 406, a third controller 407, a system chip 408, a second communication module 409 and a vibration module 410.

In FIG. 4, the second display 406, the third controller 407, the system chip 408, the second communication module 409 and the vibration module 410 are not necessarily required for the image manipulation mobile apparatus 400 according to the embodiment and may be add or deleted if necessary.

In particular, the second display 406 may be included in the image manipulation apparatus or may be separately provided as a display apparatus. If the second display 406 is separately provided as the display apparatus, the image manipulation apparatus includes a transmitter for transmitting an image. The transmitter may transmit an image to a mobile apparatus or another display apparatus in addition to the display apparatus.

Although not shown, one or more of the three-dimensional image receiver 401, the second touch event processor 404, the second renderer 405 and the third controller 407 may be included in a second memory (not shown) in the form of an application.

The three-dimensional image receiver 401 receives three-dimensional image data of an object.

The sensor 402 measures the orientation of the image manipulation mobile apparatus 400 in a three-dimensional space and may transmit raw sensor data to the second peripheral device interface 418 of the system chip 408. As shown, the raw sensor data may be sent to the second touch event processor 404 through the second peripheral device interface 418, a fourth controller 417 and a second processor 416. This is only exemplary and the raw sensor data may be directly sent to the second touch event processor 404. In one embodiment, the sensor 402 generates orientation sensor data corresponding to rotation of the image manipulation mobile apparatus 400 and touch operation data corresponding to a touch of the image manipulation mobile apparatus 400.

In one embodiment, the sensor 402 includes at least one of orientation sensors such as a compass, an accelerator or a gyro sensor and a touch sensor. The compass may measure the intensity of a magnetic field near the image manipulation mobile apparatus 400. The accelerator may measure acceleration of the apparatus according to the movement or gravity of the image manipulation mobile apparatus 400. The gyro sensor recognizes three-dimensional orientation of the image manipulation mobile apparatus 400 and has two or three axes. In one embodiment, the sensor may be a three-axis sensor, a one-axis sensor or a two-axis sensor. The sensor may be divided according to the axes.

The touch sensor sends a user touch input to the second peripheral device interface 418 of the system chip 408. The touch sensor may perform a single or multiple touch sensing. The touch may be input by a touch point, a new point, a movement point, a release point or several gestures such as tap, double tap, panning, flicking, drag and drop, pinching and stretching.

The second touch event processor 404 generates touch event occurrence data using touch operation data.

The second renderer 405 generates rendering data of a three-dimensional image using the three-dimensional image data and the touch event occurrence data. The second renderer 405 is different from the first renderer 304 of FIG. 3 in that, while the first renderer 304 uses the orientation displacement information data, the second renderer 405 generates rendering data without using the orientation displacement information data.

In one embodiment, the second renderer 405 may include a second three-dimensional image converter 413, a second rendering controller 414 and a second rendering calculator 415. The second three-dimensional image converter 413 converts the three-dimensional image in a space using the touch event occurrence data and generates three-dimensional image conversion information data. The second rendering controller 414 controls rendering characteristics such as a physical property such as texture or quality of the three-dimensional image, illumination and special effects, and transmits and receives the three-dimensional image conversion information data to and from the second three-dimensional image converter 413. The second rendering calculator 415 performs rendering, generates rendering data, and transmits the rendering data to the second display 406.

The second display 406 displays the three-dimensional image using the rendering data. Since the rendering data generated by the second renderer 405 does not use the orientation displacement information data, the three-dimensional image displayed on the second display 406 may be different from the three-dimensional image displayed on the first display 305 of the image manipulation server 300 of FIG. 3.

In one embodiment, the second display 406 may be on one surface or both surfaces of the image manipulation mobile apparatus 400. If the second display 406 is on both surfaces of the image manipulation mobile apparatus, the second display 406 may respectively display the opposite images of the three-dimensional images on the surfaces. For example, while a top view is displayed on one surface, a bottom view is displayed on the other surface.

The third controller 407 generates and transmits or receives a third control signal for controlling the three-dimensional image receiver 401, the second touch event processor 404 and the second renderer 405. The third controller 407 may receive a variety of control signals and data from the fourth controller 417 of the system chip 408.

The system chip 408 serves to perform operations and control of the components of the image manipulation mobile apparatus. In one embodiment, the system chip 408 may include a second processor 416, a fourth controller 417 and a second peripheral device interface 418. Although the components are integrated in the system chip 408 of the mobile apparatus in FIG. 4, this is only exemplary and the components may be separated. The second processor 416 performs the operations of the three-dimensional image receiver 401, the second touch event processor 404 and the second renderer 405. The fourth controller 417 generates and transmits or receives a fourth control signal for controlling the three-dimensional image receiver 401, the second touch event processor 404, the second renderer 405 and the third controller 407. The second peripheral device interface 418 receives and transmits the orientation sensor data and the touch operation data to the fourth controller 417.

The second communication module 409 transmits the orientation sensor data and the touch operation data, for example, to the server. The second communication module 409 may perform communication using one or more communication methods selected from a group including wireless LAN, GSM, EDGE, HSDPA, W-CDMA, CDMA, TDMA, Bluetooth, Zigbee, Wi-Fi, VoIP, Wi-MAX, and ultrasonic communication method, similar to the first communication module 308 shown in FIG. 3.

The vibration module 410 provides a haptic feedback to the user through vibration. The vibration module 410 may provide a vibration feedback in a manner of sending haptic force computed according to the touch event occurrence data to a motor (not shown). The computed haptic force may be sent to the motor through the second peripheral device interface 418 as shown.

Figure 5:
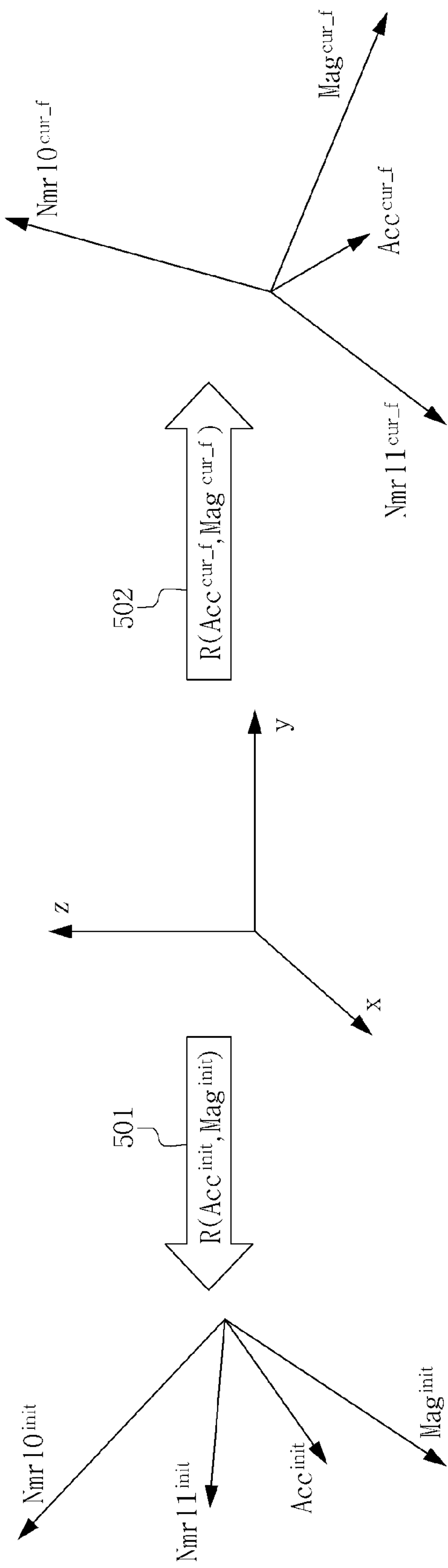
FIG. 5 is a diagram illustrating an example of a method of acquiring orientation displacement information data in an image manipulation apparatus according to an embodiment.

FIG. 5 is a diagram illustrating an example of a method of acquiring orientation displacement information data in an image manipulation apparatus according to an embodiment.

As described above, the orientation displacement information data enables the absolute orientation of the mobile apparatus to match the absolute orientation of the three-dimensional image displayed on the server. The orientation displacement information data is obtained by computing an orientation displacement from the initial orientation to the current orientation of the mobile apparatus.

In one embodiment, the noise attenuator obtains current orientation sensor data from which noise is eliminated. The noise attenuator may include one or more selected from a group including a low pass filter (LPF), a Kalman filter, an extended Kalman filter, an unscented Kalman filter and a particle filter. The orientation displacement information data is obtained by comparing the current orientation sensor data, from which noise is eliminated, with predefined "initial orientation sensor data".

The initial orientation sensor data may be expressed by a matrix Dinit, the current orientation sensor data from which noise is eliminated may be expressed by a matrix Dcur, and the orientation displacement information data may be expressed by a rotation matrix Rcur. The rotation matrix Rcur from the initial orientation to the current orientation of the mobile apparatus may be obtained by comparing Dcur with Dinit.

For example, a method of obtaining orientation displacement information data using a simple LPF will be described. In the present implementation, an accelerator and an electronic compass are used as an orientation sensor. When initial acceleration data is Accint, current acceleration data is Acccur and filtered acceleration data is Acccur_f, the filtered acceleration data Acccur_f passing through the simple LPF is expressed by the following equation.

$$Acc^{cur-f}=c^{a}\cdot Acc^{cur}+(1-c^{a})\cdot Acc^{cur-f} \quad \text{[Equation 1]}$$

Where, ca denotes a sensitivity constant of an acceleration signal.

When initial compass data is Magint, current compass data is Magcur and filtered compass data is Magcur_f, the filtered compass data Magcur_f passing through the simple LPF is expressed by the following equation.

$$Mag^{cur-f}=c^{m}\cdot Mag^{cur}+(1-c^{m})\cdot Mag^{cur-f} \quad \text{[Equation 2]}$$

Where, cm denotes a sensitivity constant of a compass signal.

Using the filtered acceleration data and the filtered compass data, an orientation displacement matrix may be obtained as follows.

R(Acc, Mag) is an orientation displacement matrix converted from a world coordinate system into a coordinate system in which the orientation of Mag is an x axis, the orientation of Nmrl0 is a y axis, and the orientation of Nmrl1 is a z axis. In the following equations, a matrix is expressed using a column major method.

Nmrl0 and Nmrl1 may be expressed by the following equation.

$$Nmrl0=\text{unit}(Acc \text{ cross } Mag)$$

$$Nmrl1=\text{unit}(Mag \text{ cross } Nmrl0) \quad \text{[Equation 3]}$$

In the above Equation, unit( ) denotes normalization to a unit vector having a length of 1 and cross denotes a cross product. As a result, R(ACC, Mag) may be expressed by the following equation.

$$R(Acc,Mag)=\{Mag,Nmrl0,Nmrl1\} \quad \text{[Equation 4]}$$

If R(ACCinit Maginit) 501 which is a matrix of an initial sensor value and R(ACCcur_f, Magcur_f) 502 which is a matrix of the filtered current sensor value are obtained using the initial orientation sensor data and the current orientation sensor data and are used as the orientation displacement matrix of the three-dimensional image, the absolute orientation of the mobile apparatus is mapped to the orientation of the three-dimensional image displayed on the display screen. That is, if the orientation displacement matrix is expressed by Rcur_f, the following equation is derived.

$$R^{cur\_f}=R(Acc^{init},Mag^{init})\cdot(R(Acc^{cur\_f},Mag^{cur\_f})^{-1}) \quad \text{[Equation 5]}$$

Referring to FIG. 5, R(ACCinit Maginit) 501 which is the matrix of the initial sensor value and R(ACCcur_f, Magcur_f) 502 which is the matrix of the filtered current sensor value are shown.

In the embodiment shown in FIG. 5, a method of eliminating noise through filtering and then obtaining orientation displacement information data is described. Unlike this method, a method of obtaining orientation displacement information data and then eliminating noise may be used. In this method, a spherical linear interpolation (SLERP) method which is a quaternion interpolation method may be used to eliminate noise (K. Shoemake, "Animating rotation with quaternion curves," ACM SIGGRAPH computer graphics, vol. 19, no. 3, pp. 245-254, 1985). This method is the same as the method of first eliminating noise in a process of computing a rotation matrix.

This method will now be described. First, current orientation sensor data in which noise is not attenuated is compared with "initial orientation sensor data" so as to obtain a rotation matrix. That is, an orientation displacement matrix indicating a current rotation orientation is obtained. When an orientation displacement matrix which is not filtered is Rcur, the following equation is obtained.

$$R^{cur}=R(Acc^{init},Mag^{init})\cdot(R(Acc^{cur},Mag^{cur})^{-1}) \quad \text{[Equation 6]}$$

Since this equation is substantially similar to Equation 5 but is not filtered, Acccur and Magcur are used instead of Acccur_f and Magcur_f. In this way, the orientation displacement matrix is obtained and then an orientation displacement matrix indicating the absolute orientation is converted into a quaternion form. That is, the orientation displacement matrix Rcur is converted into a quaternion Qcur. Quaternion improves an axis/angle expression in a rotation matrix and expresses three variables associated with a rotation axis and one variable associated with a rotation angle using a four-dimensional variable.

Rotation information converted into quaternion is subjected to LPF using a SLERP method which is an interpolation method. In the following equation, the converted quaternion Qcur is mixed with filtered Quaternion Qcur_f so as to be subjected to LPF.

$$Q^{cur\_f}=Slerp(Q^{cur\_f},Q^{cur},q^{a}) \quad \text{[Equation 7]}$$

Where, qa denotes a sensitivity constant of an acceleration signal ($0 \le qa \le 1$).

Next, the filtered quaternion Qcur_f is converted into an orientation displacement matrix, that is, a rotation matrix, so as to obtain a final orientation displacement matrix Rcur_f.

Figure 6:
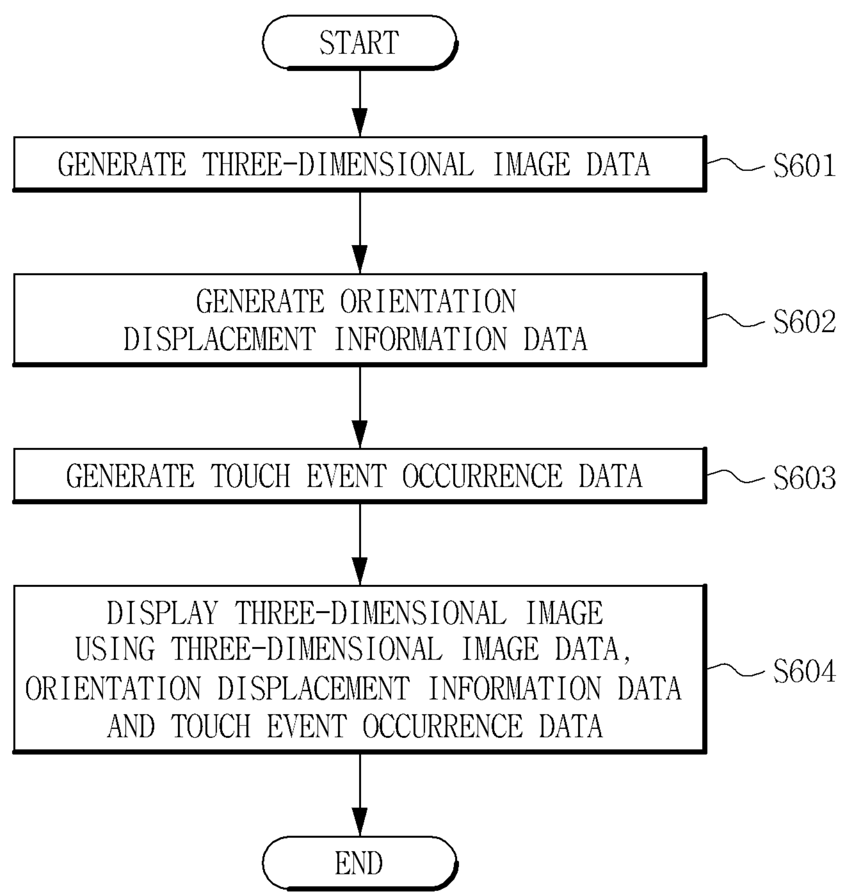
FIG. 6 is a flowchart illustrating a three-dimensional image manipulation method according to an embodiment.

FIG. 6 is a flowchart illustrating a three-dimensional image manipulation method according to an embodiment.

First, three-dimensional image data of an object is generated (S601). Next, orientation displacement information data is generated using orientation sensor data corresponding to orientation of a mobile apparatus (S602). The step (S602) of generating the orientation displacement information data may include computing an orientation displacement from an initial orientation to a current orientation of the mobile apparatus and generating the orientation displacement information data. If the orientation displacement information data is generated (S602), touch event occurrence data is generated using touch operation data corresponding to a touch of the mobile apparatus (S603). The step (S603) of generating the touch event occurrence data may be added or deleted if necessary and is not mandatory. Finally, a three-dimensional image is displayed using the three-dimensional image data, the orientation displacement information data and the touch event occurrence data (S604). The step (S604) of displaying the three-dimensional image may be replaced with a step of rendering the three-dimensional image, generating a rendering image and transmitting the rendering image if the three-dimensional image is not directly displayed.

By the above-described process, the absolute orientation of the mobile apparatus may match the absolute orientation of the three-dimensional image displayed in the step S604.

Figure 7:
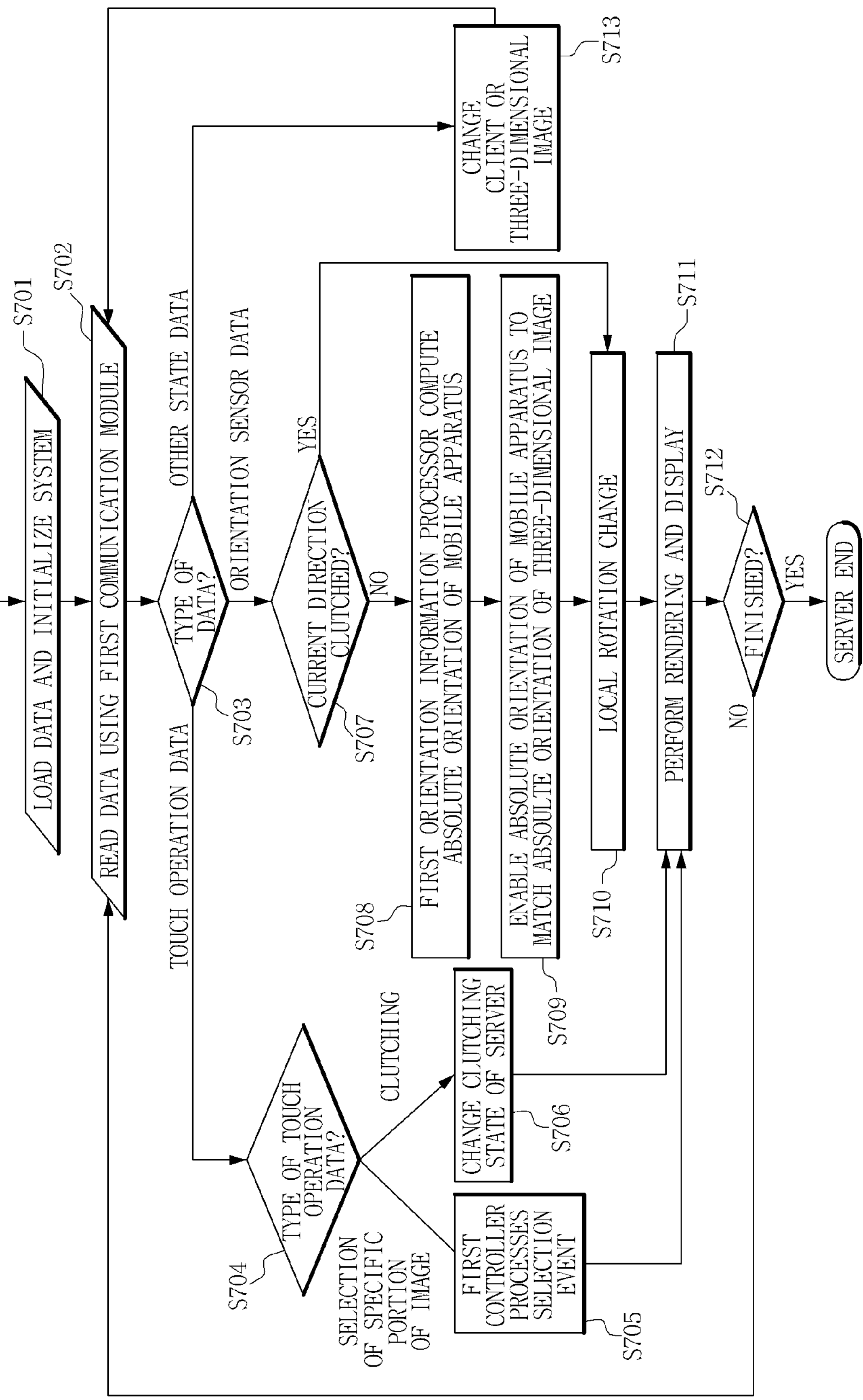
FIG. 7 is a flowchart illustrating an operation of an image manipulation server according to an embodiment.

FIG. 7 is a flowchart illustrating an operation of an image manipulation server according to an embodiment.

First, if the server begins to operate, the server generates data and initializes a system (S701). Then, the server reads data using the first communication module (S702). Next, the server checks the type of data (S703). If the type of data is touch operation data corresponding to a touch of a mobile apparatus, the type of touch operation data is checked (S704). If the type of touch operation data is associated with an operation for selecting a specific portion of a three-dimensional image, the first controller processes a selection event (S705). If the type of touch operation data is associated with clutching, the clutching of the server is changed (S706). If the type of data is orientation sensor data in step S703, it is checked whether a current orientation is clutched (S707). If the current orientation is not clutched, the first orientation information processor computes the absolute orientation of the mobile apparatus (S708). Next, the absolute orientation of the mobile apparatus is mapped to the absolute orientation of the three-dimensional image (S709). Rotation may be applied by a local orientation displacement of the mobile apparatus (S710). If the orientation is clutched, rotation may be applied by a local orientation displacement without performing a process of enabling the absolute orientation of the mobile apparatus to match the absolute orientation of the three-dimensional image (S710).

If the type of data is touch operation data or orientation sensor data, rendering is performed and the three-dimensional image is displayed (S711), after step S705, S706 or S710. Then, it is checked whether the operation of the image manipulation server is finished (S712). If the operation is finished, the operation of the server is completed and, if the operation is not finished, the server reads data again using the first communication module (S702). If the type of data is other data in step S703, the main client is changed if the other data indicates that the main client is changed, and the three-dimensional image is changed if the other data indicates that the three-dimensional image is changed (S713). In this process, other content-associated information may be transmitted.

FIG. 8 is a flowchart illustrating an operation of an image manipulation mobile apparatus according to an embodiment.

First, if a mobile apparatus begins to operate, a server generates data and initializes a system (S801). Three-dimensional image is read using the second communication module and is updated (S802). Then, it is checked whether the mobile apparatus is a main client (S803).

If the mobile apparatus is a main client, an orientation information processor calculates the absolute orientation of the mobile apparatus (S804) and transmits orientation sensor data to the second communication module (S805). If a local rotation operation is input, orientation of the three-dimensional image on the mobile apparatus is changed (S806). Then, local rotation operation data is transmitted to the server (S807).

If the mobile apparatus is not a main client but is a sub client in step S803, orientation of the three-dimensional image on the mobile apparatus is changed by a local rotation operation (S808). If the mobile apparatus is a sub client, since only a local rotation operation is possible, the absolute orientation of the mobile apparatus does not need to be computed.

After step S807 or S808, the mobile apparatus reads touch information from a touch sensor (S809) and checks the type of a touch operation (S810). If the type of the touch operation is an operation for selecting a specific portion of the three-dimensional image, it is determined which portion of the three-dimensional image is selected (S811). When one point of the rendered three-dimensional image is selected in step S811, a method of checking collision between rays generated at the three-dimensional image and the viewpoint of the user may be used as the method of determining which portion of the three-dimensional image is selected. After the determination as to which portion of the three-dimensional image is selected (S811), the touch operation data is transmitted to the server using the second communication module (S812), rendering is performed and the three-dimensional image is displayed (S813).

If the touch operation is a clutching operation as the result of checking the type of the touch operation (S810), a clutching command is transmitted to the server using the second communication module (S814), rendering is performed and the three-dimensional image is displayed (S813). After rendering and displaying (S813), it is checked whether the operation of the mobile apparatus is finished (S815). If the operation is finished, the operation of the server is completed and, if the operation is not finished, the mobile apparatus reads and updates the three-dimensional image data again using the second communication module (S802).

The image manipulation method and the operations of the image manipulation server and mobile apparatus according to the embodiment are described with reference to the flowcharts. Although the method is shown and described using a series of blocks for simplicity, the present disclosure is not limited to the order of blocks and some blocks may be performed in order different from the description of the present specification or simultaneously and various branches, flows and block orders capable of achieving the same or similar results may be implemented. All blocks shown for implementing the method described in the present specification are not necessarily required.

According to the image manipulation method and apparatus of the embodiments, it is possible to intuitively and efficiently manipulate a three-dimensional image at a long distance as compared to a three-dimensional image manipulation technique of the related art and to obtain excellent accessibility and enhanced price competiveness even when the number of users is increased, by manipulating a three-dimensional image such that an absolute orientation of a mobile apparatus is mapped to an absolute orientation of a three-dimensional image displayed on a display.

While the exemplary embodiments have been shown and described, it will be understood by those skilled in the art that various changes in form and details may be made thereto without departing from the spirit and scope of the present disclosure as defined by the appended claims.

In addition, many modifications can be made to adapt a particular situation or material to the teachings of the present disclosure without departing from the essential scope thereof. Therefore, it is intended that the present disclosure not be limited to the particular exemplary embodiments disclosed as the best mode contemplated for carrying out the present disclosure, but that the present disclosure will include all embodiments falling within the scope of the appended claims.

What is claimed is:

1. An image manipulation apparatus for displaying a three-dimensional image of an object displayed on a display apparatus in correspondence with orientation of a mobile apparatus, comprising:

an orientation information processor of the mobile apparatus configured to generate orientation displacement information corresponding to orientation of the mobile apparatus to match an absolute orientation of the mobile apparatus with an absolute orientation of a three-dimensional image displayed on the display apparatus;

a touch screen event processor of the mobile apparatus configured to receive, from the touch screen of the mobile apparatus, touch operation information corresponding to a touch of at least a part of an image displayed on a touch screen of the mobile apparatus and generate touch event occurrence information using the touch operation information;

a renderer configured to generate a rendering image of the three-dimensional image using the three-dimensional image of the object, the orientation displacement information, and the touch event occurrence information; and a transmitter configured to transmit the rendering image to the display apparatus and to a plurality of mobile apparatuses, wherein the mobile apparatus displays a first three-dimensional image using only the touch event occurrence information so that the three-dimensional image displayed on the mobile apparatus is different from a second three-dimensional image displayed on the display apparatus, wherein the touch event occurrence information is used to perform at least one of a change in a selection, a rotation, an orientation, and an operation on at least part of the first image.

2. The image manipulation apparatus according to claim 1, wherein the orientation information processor receives orientation sensor information corresponding to orientation of the mobile apparatus from the mobile apparatus and generates the orientation displacement information using the orientation sensor information.

3. The image manipulation apparatus according to claim 2, wherein the orientation information processor includes:

a noise attenuator configured to receive the orientation sensor information and eliminate noise; and a three-dimensional displacement information calculator configured to receive the orientation sensor information from which noise is eliminated, calculate an orientation displacement from an initial orientation to a current orientation of the mobile apparatus, and generate the orientation displacement information.

4. The image manipulation apparatus according to claim 2, wherein the orientation information processor includes:

a three-dimensional displacement information calculator configured to receive the orientation sensor information, calculate an orientation displacement from an initial orientation to a current orientation of the mobile apparatus, and generate the orientation displacement information; and a noise attenuator configured to receive the orientation displacement information and eliminate noise.

5. The image manipulation apparatus according to claim 4, wherein the noise attenuator eliminates noise using a spherical linear interpolation (SLERP) method which is a quaternion interpolation method.

6. The image manipulation apparatus according to claim 4, wherein the noise includes one or more selected from a group consisting of a low pass filter (LPF), a Kalman filter, an extended Kalman filter, a unscented Kalman filter and a particle filter.

7. The image manipulation apparatus according to claim 1, wherein the renderer includes:

a three-dimensional image converter configured to convert the three-dimensional image in a space using the orientation displacement information and the touch event occurrence information and generate three-dimensional image conversion information;

a rendering controller configured to control a physical property and rendering characteristics of the three-dimensional image to be rendered and transmit or receive the three-dimensional image conversion information to or from the three-dimensional image converter; and a rendering calculator configured to perform rendering and generate and transmit rendering information.

8. The image manipulation apparatus according to claim 7, further comprising a first controller configured to generate and transmit or receive a first control signal for controlling the three-dimensional image generator, the orientation information processor, the touch event processor and the renderer.

9. The image manipulation apparatus according to claim 8, which further comprises a system chip including:

a processor configured to perform operations of the three-dimensional image generator, the orientation information processor, the touch event processor and the renderer;

a second controller configured to generate and transmit or receive a second control signal for controlling the three-dimensional image generator, the orientation information processor, the touch event processor, the renderer and the first controller; and a peripheral device interface for receiving and transmitting the orientation sensor information and the touch operation information to the second controller.

10. The image manipulation apparatus according to claim 9, further comprising a communication module configured to receive the orientation sensor information and the touch operation information from the mobile apparatus and transmit the orientation sensor information and the touch operation information to the peripheral device interface.

11. The image manipulation apparatus according to claim 10, wherein the communication module performs communication using one or more communication methods selected from a group consisting of wireless Local Area Network (LAN), Metropolitan Area Network (MAN), Global System for Mobile Communication (GSM), Enhanced Data GSM Environment (EDGM), High Speed Downlink Packet Access (HSDPA), Wideband Code Division Multiple Access (W-CDMA), Code Division Multiple Access (CDMA), Time Division Multiple Access (TDMA), Bluetooth, Zigbee, Wi-Fi, Voice over Internet Protocol (VoIP), World Interoperability for Microwave Access (Wi-MAX), and ultrasonic communication method.

12. The image manipulation apparatus according to claim 1, further comprising a memory, wherein the three-dimensional image generator, the orientation information processor, the touch event processor and the renderer are included in the memory.

13. The image manipulation apparatus according to claim 1, wherein the transmitter transmits the rendering image to another display apparatus.

14. An image manipulation method of displaying a three-dimensional image of an object displayed on a display apparatus in correspondence with orientation of a mobile apparatus, comprising:

generating orientation displacement information corresponding to orientation of the mobile apparatus to match an absolute orientation of the mobile apparatus with an absolute orientation of a three-dimensional image displayed on the display apparatus;

receiving, from a touch screen of the mobile apparatus, touch operation information corresponding to a touch at least a part of an image displayed on the touch screen of the mobile apparatus;

generating touch event occurrence information using the touch operation information;

generating a rendering image of the three-dimensional image using the three-dimensional image, the orientation displacement information, and the touch event occurrence information; and transmitting the rendering image to the display apparatus and to a plurality of mobile apparatuses, wherein the mobile apparatus displays the three-dimensional image using only the touch event occurrence information, so a first three-dimensional image displayed on the mobile apparatus is different from a second three-dimensional image displayed on the display apparatus, wherein the touch event occurrence information is used to perform at least one of a change in a selection, a rotation, an orientation, and an operation on at least part of the first image.

15. The image manipulation method according to claim 14, wherein the generating orientation displacement information includes calculating an orientation displacement from an initial orientation to a current orientation of the mobile apparatus and generating the orientation displacement information.

16. The image manipulation method according to claim 15, wherein the generating of the orientation displacement information includes:

receiving orientation sensor information and eliminating noise; and receiving the orientation sensor information from which noise is eliminated, calculating an orientation displacement from an initial orientation to a current orientation of the mobile apparatus, and generating the orientation displacement information.

17. The image manipulation method according to claim 15, wherein the generating orientation displacement information includes:

receiving orientation sensor information, calculating an orientation displacement from an initial orientation to a current orientation of the mobile apparatus, and generating the orientation displacement information; and receiving the orientation displacement information and eliminating noise.

18. The image manipulation method according to claim 17, wherein the eliminating noise uses a SLERP method which is a quaternion interpolation method.

19. The image manipulation method according to claim 17, wherein, in the eliminating nose, noise is eliminated using one or more selected from a group consisting of a LPF, a Kalman filter, an extended Kalman filter, a unscented Kalman filter and a particle filter.

20. The image manipulation method according to claim 14, wherein the transmitting includes transmitting the rendering image to another display apparatus.

* * * * *